A. J. SCHREINER.
RESERVE SUPPLY CONTROLLING DEVICE FOR LIQUID RECEPTACLES.
APPLICATION FILED MAY 5, 1920.

1,416,886.

Patented May 23, 1922.

Inventor:
ANDREW J. SCHREINER
by
Frank L. Sessions
Attorney

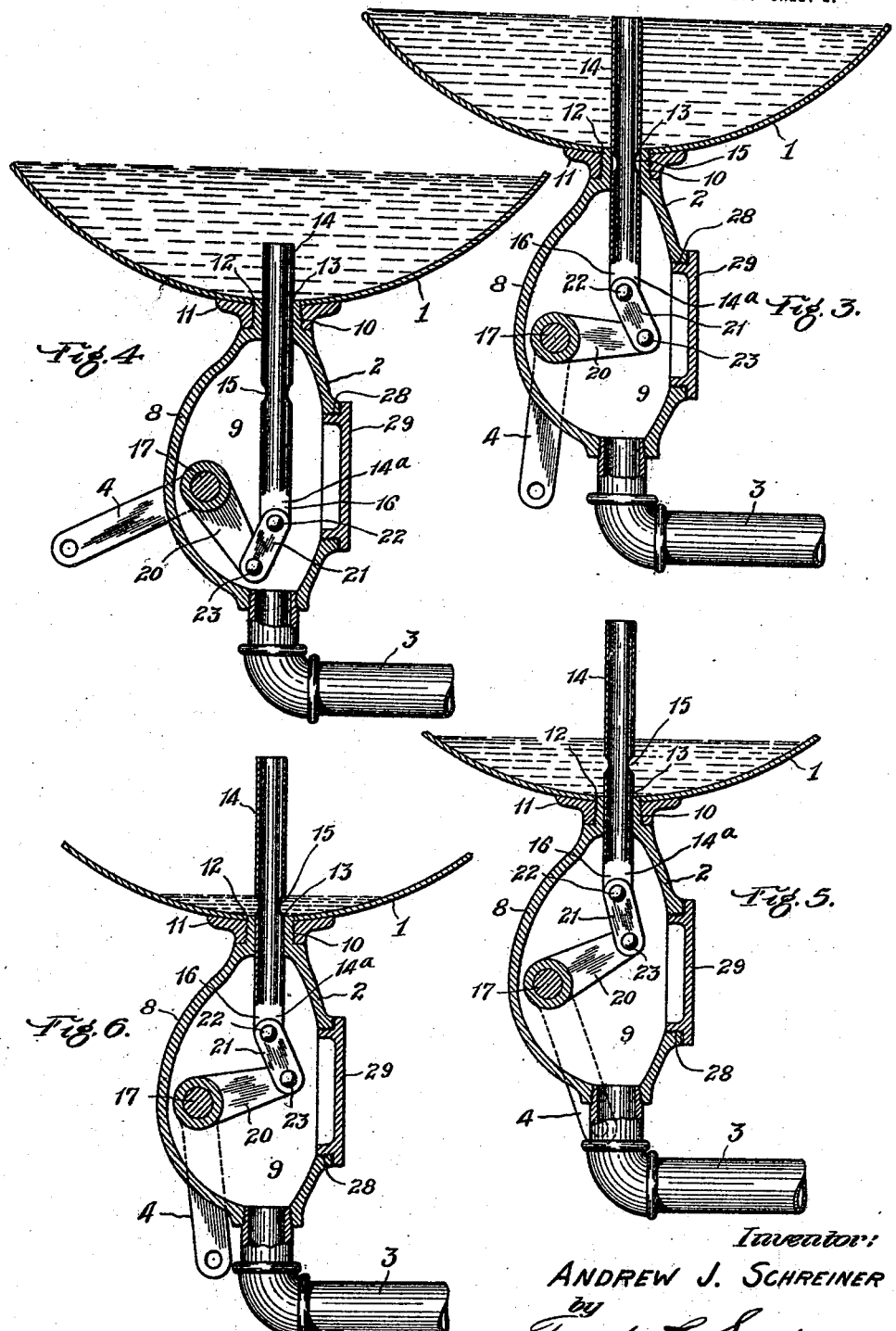

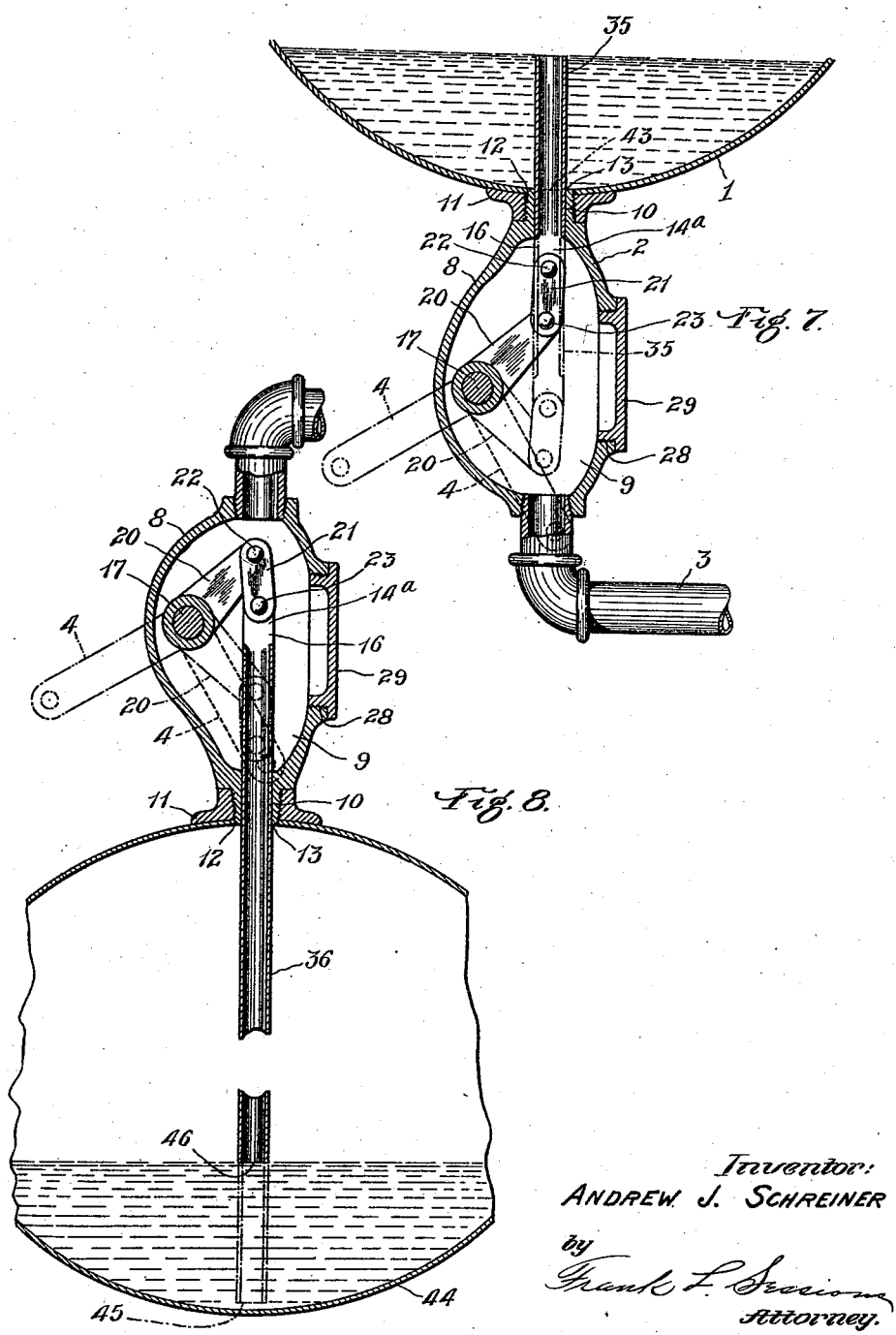

UNITED STATES PATENT OFFICE.

ANDREW J. SCHREINER, OF CLEVELAND, OHIO.

RESERVE-SUPPLY-CONTROLLING DEVICE FOR LIQUID RECEPTACLES.

1,416,886.

Specification of Letters Patent. Patented May 23, 1922.

Application filed May 5, 1920. Serial No. 379,084.

*To all whom it may concern:*

Be it known that I, ANDREW J. SCHREINER, a citizen of the United States, residing at Cleveland, in the county of Cuyahoga and State of Ohio, have invented certain new and useful Improvements in Reserve - Supply- Controlling Devices for Liquid Receptacles, of which the following is a specification.

My invention is particularly useful in connection with gasoline tanks used upon motor vehicles but it may be applied to any liquid tank or other receptacle where it is desired that a warning be given of the approaching exhaustion of the supply of liquid in the receptacle before the supply is in fact completely exhausted.

Among the objects of my invention is the provision of a device which may be attached to or incorporated in the structure of the tank or receptacle so that a reserve supply of liquid may be available for use, after the warning of its approaching exhaustion has been given, without employing an auxiliary tank or partitions of any sort in the main tank; the provision of a simple, inexpensive but reliable reserve supply controlling device which may be attached either to the bottom or the top of the tank or receptacle and operated from the outside of the tank; the provision of a reserve supply controlling device which may be installed in the ordinary feed pipe connection opening without requiring any additional hole to be made in the tank for installing the device or for its subsequent operation; the provision of a reserve supply controlling device which may be installed in the top of the supply tank for use in connection with vacuum or pressure liquid supply system or be installed in the bottom of the supply tank for use in connection with either vacuum, pressure or gravity systems; and the provision of a reserve supply controlling device which may be easily installed upon tanks already in use as well as upon new tanks.

These and other objects are attained by the use of my invention described herein and shown in the accompanying drawings in which Fig. 1 is an assembly view of my invention installed in the bottom of a motor vehicle gasoline supply tank and provided with a remote setting device and indicator mounted upon the dash or instrument board of the vehicle;

Fig. 3 is a vertical section on line III—III of Fig. 2;

Fig. 4 is a view similar to Fig. 3 but with the device set for an intermediate reserve supply;

Fig. 5 is a view similar to Figs. 3 and 4 with the exception that the device is set for the minimum reserve supply;

Fig. 6 is a view similar to Figs. 3, 4 and 5 with the exception that the device is set so that all of the liquid in the tank may be used;

Fig. 7 is a vertical section of a device similar to that shown in the preceding figures with the exception that in the device shown in Fig. 7 there are no port holes through the sliding tube;

Fig. 8 is a vertical section of a device embodying my invention mounted upon the top of a liquid supply tank;

Figure 1:
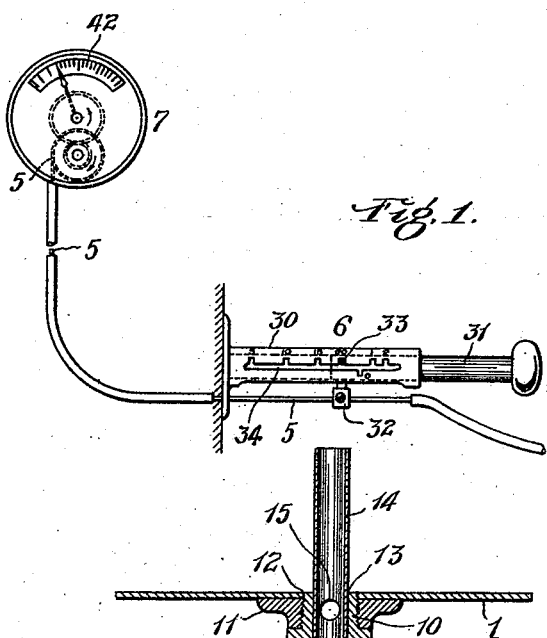

In the drawings and with particular reference to Fig. 1, a portion of the main liquid supply tank is shown at 1. The reserve supply controlling device is shown at 2, connected to the bottom of the tank and making a fluid tight joint therewith by being threaded into the supply pipe connection provided at this point. 3 is the supply pipe leading from the controlling device to the point where the liquid flowing from tank, 1, is to be used. The operating lever, 4, of the device may be connected by means of a wire or other suitable operating connection, 5, with the setting device, 6, and may be also connected with the indicator, 7.

In the embodiment of my invention shown in Figs. 2, 3, 4, 5 and 6, 8 is a valve housing or body member provided with the chamber, 9, and having one end, 10, adapted to be connected to the wall of the liquid supply tank.

In the drawings, the tank, 1, has a threaded, flanged pipe connection, 11, reinforcing the walls of the outlet opening, 12, of the tank. The valve housing, 8, is provided with a threaded shank, 10, which screws into the pipe connection, 11, supports the device and also makes a fluid tight joint around the outlet, 12. The valve housing, 8, is provided with an aperture, 13, which registers with the aperture, 12, of the tank and connects the interior of the supply tank with the chamber, 9, of the valve housing. It will be understood that any other suitable means than that shown may be employed to secure the valve housing to the tank or receptacle. The reserve supply or liquid level controlling member or valve consists of a tube, 14, which has a sliding fit in the aperture, 13. In the structure shown in Figs. 2 to 6 inclusive, the tube, 14, is provided with a side opening or openings, 15. The upper end of tube, 14, is open. The opening, 15, and the open top end of the tube, 14, constitute outlet ports for the liquid in the receptacle equipped with my invention. The lower end of tube, 14, opens into the chamber, 9, as shown at 14ᵃ and is provided with ears, 16, for connecting it with the operating mechanism.

To raise and lower the valve member, 14, there is provided, preferably, a tapered rod, 17, adapted to rotate in suitably formed bearings, 18 and 19, in the wall of the chamber, 9. Mounted upon a rod, 17, and secured thereto for rotation therewith is the crank or lever, 20, which is connected to the valve member, 14, by means of the link, 21, which is pivoted to the member, 14, by means of a pin, 22, and to the crank by means of the pin, 23. One end of the rod, 17, projects from the housing, 8, and has secured to it the operating lever, 4, or other convenient means for rotating rod, 17. A spring such as shown at 24, attached to an extension, 25, of lever 4, may be employed for moving the reserve supply controlling member towards maximum reserve supply position, if desired.

The operating rod, 17, being tapered and fitting in reamed holes, 18 and 19, makes fluid tight joints with the housing, 8. A spring, 26, and nut, 27, the latter threaded upon the projecting end of rod, 17, may be employed for holding the latter securely to its position in bearings, 18 and 19, in a well known manner.

An opening, 28, may be provided in housing, 8, opposite the rod, 17, so as to permit the assembling of the parts within the housing. A closure, such as the threaded, flanged plug, 29, may be provided for closing the opening, 28, after the parts are assembled.

It will be evident that the lever, 4, may be operated directly by hand or that it may be connected for remote operation as shown in Fig. 1. The setting device shown at 6 in Fig. 1 consists of a stationary tubular support, 30, within which there is mounted for longitudinal movement the rod or plunger, 31, provided with a projection, 32, to which the operating rod, cord or wire, 5, is connected. The plunger, 31, is provided with a pin, 33, adapted to slide in a slot, 34, formed in the tubular support, 30, and to enter notches in the side of the slot to hold the reserve supply controlling member in any position desired.

In addition to the setting device, 6, there may be an indicating device, such as shown at 7, also connected to the rod or wire, 5, and located upon the instrument board of the vehicle where it may be readily seen by the driver. I prefer that both the setting device, 6, and indicator, 7, be employed, although any other means than the setting device, 6, may be employed for holding the reserve supply controlling member in the desired position and any other form of indicator than that shown in Fig. 3 may be employed, or, my invention may be used without either the setting device, 6, or the indicator, 7, dependence being placed upon the position of the lever, 4, or an indicating projection thereon or other means for determining the position of the reserve supply controlling member.

In the form of my invention shown in Figs. 7 and 8, I dispense with the port holes, 15, and employ only a tubular reserve supply controlling member such as shown at 35 in Fig. 7 and at 36 in Fig. 8. Fig. 7 shows the device connected to the bottom and Fig. 8 shows the device connected to the top of the tank. All the parts of the devices shown in Figs. 7 and 8 are alike with the exception of the reserve supply controlling member, which in the case of the device being mounted upon the top of the tank has to be made longer than when it is mounted at the bottom of the tank.

All parts of the device in Figs. 7 and 8 are similar in every way to the corresponding parts shown in Figs. 1 to 6 inclusive with the exception of the reserve supply controlling member. The operating lever, 4, of the device shown in Figs. 7 and 8 may be set in any desired position from the point where the maximum reserve supply is available after the first warning down to the point where the supply tank may be emptied of all the liquid it contains.

Figure 9:
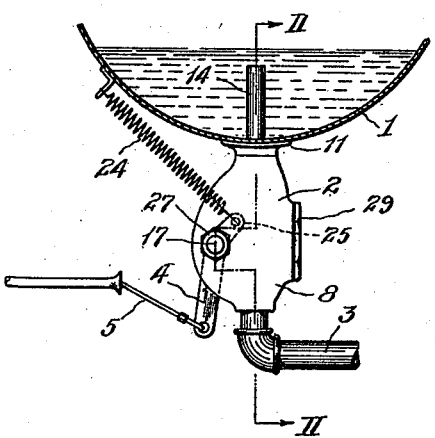
Fig. 9 is a vertical section through a device embodying my invention, having a modified form of valve operating rod.

In Fig. 9 there is shown a modified construction in which the operating rod, 37, has only a single bearing, 38, in the housing, 39. Rod, 37, and its bearing, 38, are tapered and fitted so as to provide a fluid tight joint regardless of wear of the parts. A spring, 40, and cap, 41, may be provided for holding the rod, 37, to its bearings in housing, 39. This construction eliminates one of the bearings and one of the fluid tight joints which are necessary in the construction shown in Figs. 2 to 6 inclusive. As the means which I employ for moving the valve is in the chamber formed in the valve housing and is supported by the valve housing and makes a fluid tight joint with it, it is unnecessary to provide any opening in the tank for installing the controlling device other than the customary outlet opening.

Figure 10:
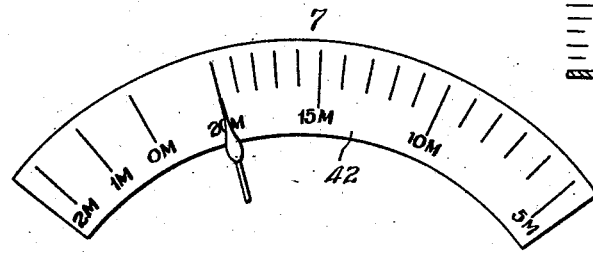
Fig. 10 is an enlarged view of the dial of the indicator shown in Fig. 1.
Figure 2:
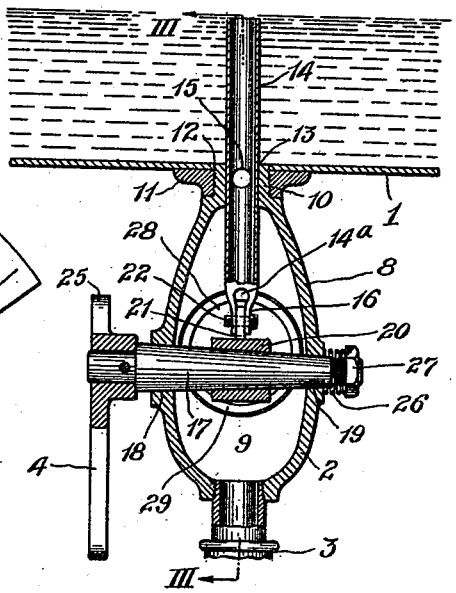
Fig. 2 is a vertical section on line II—II of Fig. 1 showing the device set for maximum reserve supply.

In Fig. 10 there is shown an enlarged view of the dial, 42, of the indicator, 7. The scale of the dial may be graduated to show either the quantity of liquid remaining in the tank or the miles that the automobile upon which the tank may be mounted may be propelled by the fuel remaining in the tank after the warning has been given. The dial shown in the drawings is graduated in the latter way.

The operation of my invention is as follows: With the device connected to the bottom of the tank or receptacle as shown in Figs. 1 to 6 inclusive, and in Fig. 9, the reserve supply controlling member, 14, may be set to give warning by causing the flow of liquid to cease when its level in the tank has fallen to any point from that corresponding to the maximum reserve supply down to the point where all of the liquid may be withdrawn from the tank. The position of member, 14, in Figs. 1, 2, 3 and 9 leaves the maximum reserve supply available after the warning has been given. By setting the tube, 14, in a lower position than shown in Figs. 1, 2, 3 and 9 a smaller reserve supply may be had after the warning, down to that which corresponds to the level of the top of tube, 14, as shown in Fig. 4 in which it is seen in its lowest position. By raising tube, 14, so that port, 15, stands above the bottom of the receptacle as shown in Fig. 5, the level of the liquid left in the receptacle after the warning will be even with the bottom of port, 15. By setting the tube, 14, so that port, 15, is at the bottom of the receptacle as shown in Fig. 6, all of the liquid may be withdrawn.

In the form of my invention shown in Fig. 7, the reserve supply controlling member, 35, has no port corresponding to port, 15, in tube, 14, and the amount of the reserve supply available after the warning is determined by the height of the open top of tube, 35, above the bottom of the receptacle. The tube, 35, may be set so that its top will stand at any desired height above the bottom of the receptacle between the position shown by the full lines and that shown by the dotted lines, corresponding respectively to maximum reserve supply and no reserve supply, in Fig. 7. In the latter position the top of tube, 35, will be at the bottom, 43, of the receptacle.

In Fig. 8 my invention is shown installed at the top of the supply tank. To adapt it to such usage, the reserve supply controlling member or tube, 36, is made long enough to extend close to the bottom of the tank, 44, as shown in dotted lines at 45. When the tube is in this position all of the liquid in the tank may be withdrawn and there is no reserve supply available. By setting the tube, 36, with its open lower end at a distance above the bottom of the tank, any desired reserve supply may be had up to the maximum which is determined by the limit of upward movement of the tube. In Fig. 8 the lower end of tube, 36, is shown in full lines at 46 in the position to leave the maximum reserve supply in the tank. It is evident that when tube, 36, is set with its lower end intermediate the positions, 45 and 46, a smaller reserve supply will be left in the tank after the warning has been given.

In Fig. 8, the lever, 4, is shown inverted. This makes the lever move in the same direction relative to the tank, to set the reserve supply controlling member, as when the device is attached to the bottom of the tank. Any other suitable means than lever, 4, may be employed for operating the device.

In most instances it is not essential that the sliding fit of the tubular valve member in the aperture in the valve housing be fluid tight. Ordinarily if a mechanical sliding fit of these parts be made the device will function satisfactorily. Usually the only requirement as to the character of this fit is that it be made tight enough to so restrict the flow of liquid after the reserve supply level in the receptacle has been reached as to give the desired warning, such, for instance, as the stoppage of the engine which is being supplied with fuel through the reserve supply controlling device. It is obvious that as long as the liquid is being drawn from the supply receptacle it is immaterial whether all of it flows through the tubular valve member and part of it through the joint between the tubular valve member and the valve housing. When the flow of liquid is stopped by closing a valve in pipe, 3, or elsewhere in the liquid supply connections, the level of liquid in the supply receptacle will become stationary. From this it will be seen that my invention can be manufactured without undue accuracy and that its cost will be small.

While, in most usages, it is desirable to install the reserve supply controlling device at the highest or lowest point of the tank with the tubular, liquid conducting valve member vertical, it will be understood that the device may be installed at any other point than the extreme top or bottom of the tank and that the valve member may be inclined from a vertical position, it being only necessary that the device be installed at such a point that the desired amount of liquid may be withdrawn from the tank, and that the range of movement of the valve member provides the desired change of level of the outlet port.

It will be seen that the amount of liquid remaining in the tank when the warning of its approaching exhaustion is given is determined by the height of the outlet port in the liquid conducting valve member above the bottom of the tank and that a further supply of liquid may be then withdrawn from the tank by moving the valve member to lower the height of the same outlet port instead of by opening a second outlet port at a lower level as has heretofore been done in reserve liquid supply controlling devices with which I am familiar.

Having thus described my invention, I claim:

1. The combination with a liquid receptacle provided with a substantially vertical outlet opening, of a valve housing secured to said receptacle, said housing having an aperture registering with said outlet opening, a tubular valve member in said aperture adapted to slide therein, one end of said valve member extending into said receptacle and having an outlet port, the other end of said tubular valve member having a port opening into a chamber in said housing and means extending through the wall of said housing into said chamber and connected to said valve member for moving said valve member in said aperture to vary the height of said outlet port above the bottom of said receptacle.

2. The combination with a liquid receptacle, of a valve housing provided with a chamber having an aperture opening into said receptacle, a liquid conducting valve member in said aperture adapted to slide therein, said valve member being provided with one port opening into said receptacle and another port opening into said chamber, and means extending through the wall of said housing into said chamber and connected to said valve member for moving said valve member in said aperture to vary the height of said first named port in said receptacle.

3. In a reserve supply controlling device for liquid receptacles, a housing adapted to be connected to the outlet of a liquid receptacle, said housing being provided with a chamber having an aperture adapted to register with said outlet, a liquid conducting valve member extending through said aperture adapted to conduct liquid from such a receptacle to said chamber and having a sliding fit in said aperture, said valve member having two port openings one opening into said chamber and the other being adapted upon movement of the valve member in one direction to open into the receptacle to which said housing may be connected and means extending through the wall of said housing into said chamber and connected to said valve member for moving said valve member longitudinally in said aperture.

4. In a reserve supply controlling device for liquid receptacles, the combination of the structure described in claim 2 with yielding means for holding the liquid level controlling member in maximum reserve supply position.

5. The combination of the reserve supply controlling device for liquid receptacles described in claim 2 with position setting means remote from said receptacle, and operating connections between said device and said position setting means.

6. The combination of the reserve supply controlling device for liquid receptacles described in claim 2 with position indicating means remote from said receptacle, and means connecting said device with said indicating means whereby movement of the liquid level controlling member produces corresponding movement of said indicating means.

7. A receptacle for liquid provided with an outlet opening, a liquid conducting member sliding in said opening having a port opening in said receptacle, said liquid conducting member extending outwardly from said receptacle through said outlet and means supported on said receptacle connected to said outwardly extending portion of said liquid conducting member for moving said liquid conducting member to vary the height of said port opening above the bottom of said receptacle.

8. In apparatus of the class described, a valve housing having an aperture, a tubular valve in said aperture adapted to slide therein and to conduit liquid therethrough, said valve housing having a chamber opening into said aperture, and operating means in said chamber connected to said valve for operating said valve, said operating means extending through and being carried by the wall of said housing and being adapted to receive an operating member upon its extended portion, and means for maintaining a fluid tight joint between said housing and said operating means.

9. In apparatus of the class described, a valve housing having an aperture, a tubular valve in said aperture adapted to slide therein and to conduct liquid therethrough, said valve housing having a chamber opening into said aperture, a tapered rod disposed transversely to the axis of said valve and accurately fitting in a tapered aperture in said housing, means on said rod within said chamber connected to said valve for operating said valve, said rod extending outwardly from the wall of said housing, and means secured to said rod outside of said housing for actuating said rod.

In testimony whereof I affix my signature.

ANDREW J. SCHREINER.